(No Model.)

J. F. McNUTT.
COUNTER.

No. 601,879.

Patented Apr. 5, 1898.

Witnesses

Inventor

UNITED STATES PATENT OFFICE.

JOHN F. McNUTT, OF WARREN, OHIO, ASSIGNOR TO THE HARRIS AUTOMATIC PRESS COMPANY, OF NILES, OHIO.

COUNTER.

SPECIFICATION forming part of Letters Patent No. 601,879, dated April 5, 1898.

Application filed June 25, 1897. Serial No. 642,331. (No model.)

*To all whom it may concern:*

Be it known that I, JOHN F. McNUTT, of Warren, in the county of Trumbull and State of Ohio, have invented certain new and useful Improvements in Counters; and I do hereby declare the following to be a full, clear, and exact description of the invention, such as will enable others skilled in the art to which it appertains to make and use the same.

This invention contemplates certain new and useful improvements in counters designed to be used with printing-presses or other machinery in connection with which a tally or record is to be kept.

The object of the invention is to provide a counter which will be simple in construction, inexpensive, and durable, one capable of being operated from either end, and one which will give a signal periodically, indicating at predetermined points the number of times the counter has been operated.

The invention will be hereinafter fully set forth, and particularly pointed out in the claims.

Figure 1:
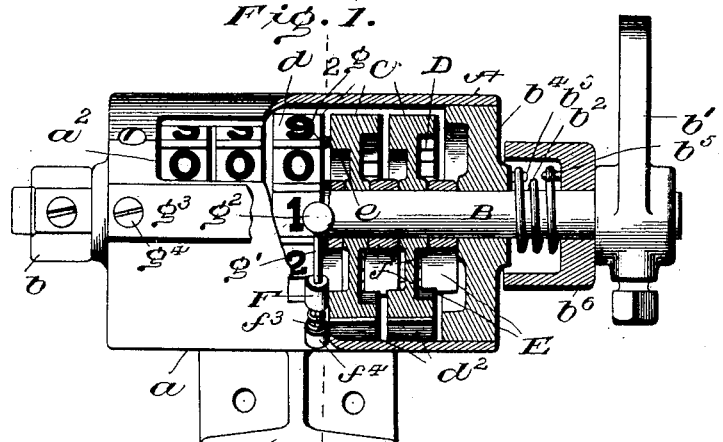
Figure 2:
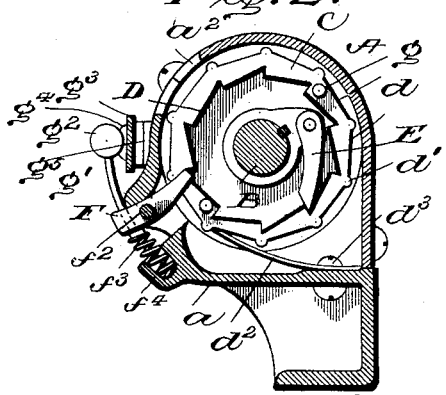
Figure 3:
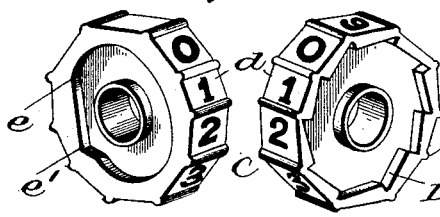
Figure 4:
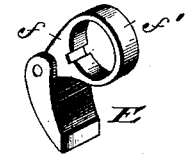
Figure 5:
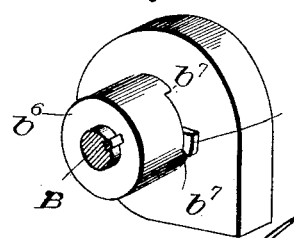

In the accompanying drawings, Figure 1 is a front elevation with parts broken away and in section. Fig. 2 is a transverse section on line 2 2, Fig. 1. Fig. 3 shows in perspective opposite views of one of the dial-wheels. Fig. 4 is a view of one of the pawls and its carrying-arm. Fig. 5 is a view in perspective showing a portion of one end of the casing.

Referring to the drawings, A designates a casing of approximately cylindrical shape in cross-section, having a lower flattened portion $a$ and a web $a'$ by which it can be secured to any suitable support. In one side of this casing, near its top, is a longitudinal opening $a^2$.

B is a shaft extended longitudinally through casing A. On one end is a removable collar $b$, while on the other end is an arm $b'$, which can be connected by a cord or wire (not shown) to any movable part of the machine in connection with which the counter is used, it being necessary to periodically impart to said shaft only a partial rotation. The shaft is returned to its normal position after each operation by a spring $b^2$, one end of which is secured to a pin $b^3$, extending from one of the end heads $b^4$, its other end being attached to a pin $b^5$ of a hollow cap $b^6$, through which the shaft extends. On the inner periphery of this cap are two shoulders $b^7$, designed to engage a stop $b^8$ projecting from the head $b^4$, said stop limiting the movements of the shaft B. By transposing the collar $b$ and arm $b'$ the counter may be operated at the other end of the casing.

Loose on the shaft B within the casing are five (more or less) dial-wheels C, each of which on its periphery is provided with ten spaces $d$ for ciphers or numerals extending from "0" to "9." Between these spaces are transverse beads $d'$, with which engage the free ends of plate-springs $d^2$, held at $d^3$ to the bottom of the casing. These springs engage the wheels so as to hold them at the points to which moved, one figure of each wheel being visible through the sight-opening $a^2$. On one side of each wheel is a circular series of teeth D, while on the other face of each wheel is a smooth flange $e$, having a single tooth or recess $e'$. With the exception of the point where this tooth is formed the inner periphery of flange $e$ is throughout on the same circular plane with the extreme inner ends of the teeth D; but the wall of the recess forming tooth $e'$ corresponds to the teeth on the other side of the wheel. The teeth D of each wheel are designed to be engaged by a pawl E, pivoted to and depending from a short arm $f$, whose hub $f'$ is keyed on shaft B, said hubs of the intermediate arms fitting snug between the opposite faces of adjacent wheels. These pawls nearly fill the space between the opposite smooth faces of adjoining wheels. The pawl for operating the first wheel C is always in engagement with the teeth D thereof, but the circular periphery of flange $e$ of said wheel serves to hold the pawl of the next adjacent wheel out of contact with the toothed flange D thereof save when it is in line with the recess formed by the single tooth or shoulder $e'$. In other words, when the numeral "9" arises in line with the sight-opening the recess of said tooth $e'$ will be in such position that the end of the adjacent pawl, when the latter is brought back for registering a stroke, will fall into said recess and at the same time engage one of the teeth D of the next adjacent wheel, and on the forward stroke will move the latter the extent of one number. This will not again occur until the wheel to the right has again made one complete revolution. Hence it will follow that the second dial-wheel upon completing one revolution will move the third wheel one point, each wheel being held at the point to which moved by the springs $d^2$.

F is a lever fulcrumed at $f^2$ and extended at one end through an opening in the casing. It is normally held raised at its outer end by a coil-spring $f^3$, fitting in a hollow boss $f^4$ of casing A. Its inner end is extended between two of the wheels C and is designed to be tripped by short pins $g$, projecting from the face of one of the wheels, said pins being at directly opposite points. To the outer end of this lever is secured a hammer-arm $g'$, having a ball $g^2$ on its free end which is designed to strike against a sounding-plate $g^3$, which is held at its ends by screws $g^4$ to posts $g^5$, projecting from the casing. As the lever is tripped, the hammer will strike against the plate $g^3$, and thus give a signal. This is preferably designed to occur at the completion of every fifty strokes of the arm on the operating-shaft.

The advantages of my invention are apparent to those skilled in the art to which it appertains. It will be seen that a counter constructed in accordance therewith is extremely simple and inexpensive, is positive in operation, and not liable to readily get out of order. It will be understood that a greater or lesser number of dial-wheels may be employed.

I claim as my invention—

1. The combination with a casing having a sight-opening therein, of a shaft mounted in said casing, a series of dial-wheels on said shaft, and means for successively operating the same, a cap secured on said shaft, a spring engaging said shaft, and a stop adapted to limit the movement of said shaft by engaging with said cap, substantially as set forth.

2. The combination with a casing having a sight-opening therein, of a shaft mounted in said casing, a series of dial-wheels on said shaft, and means for successively operating said wheels, a stop projecting from one end of said casing, a cap secured on said shaft and having shoulders designed to engage said stop, and a spring encircling said shaft within said cap and connected to the latter, substantially as set forth.

3. The combination of a casing, a shaft mounted therein, dial-wheels on said shaft, and means for successively operating the same, a cap secured on the end of said shaft, a spring within said cap connected thereto at one end, its other end being secured to said casing, a stop adapted to limit the movement of said shaft, a lever engaged by one of said dial-wheels, a hammer carried by said lever, and a sounding-plate secured to said casing and adapted to be struck by said hammer, substantially as set forth.

4. The combination of a casing, a shaft mounted therein, dial-wheels on said shaft, and means for successively operating the same, a cap secured on the end of said shaft, a spring within said cap connected thereto at one end, its other end being secured to said casing, a stop adapted to limit the movement of said shaft, a spring-pressed lever engaged by one of said dial-wheels, a hammer carried by said lever, posts projecting from said casing, and a sounding-plate secured to said posts and adapted to be struck by said hammer, substantially as set forth.

5. The combination with the casing having an upper sight-opening, a lower opening and a hollow boss in line therewith, of a shaft extended through said casing having dial-wheels thereon, a lever fulcrumed in said lower opening and designed to be operated by one of said dial-wheels, a spring fitted in said boss and bearing against said lever, a hammer carried by said lever, and a sounding-plate secured to said casing and designed to be struck by said hammer, substantially as set forth.

In testimony whereof I have signed this specification in the presence of two subscribing witnesses.

JNO. F. McNUTT.

Witnesses:
W. H. SMILEY,
MARY MAGEE.